United States Patent
Lefebvre et al.

(10) Patent No.: US 11,702,083 B2
(45) Date of Patent: Jul. 18, 2023

(54) USING ISA SYSTEM TO IMPLEMENT A SPEED POLICY IDENTIFIED BASED ON PROFILE OF A DRIVING INSTANCE

(71) Applicant: 7980302 CANADA INC., Montreal (CA)

(72) Inventors: Gabriel Paquin Lefebvre, Montreal (CA); Mathieu Boivin, Mount Royal (CA); George Bassily, Laval (CA)

(73) Assignee: 7980302 CANADA INC., Montreal (CA)

( * ) Notice: Subject to any disclaimer, the term of this patent is extended or adjusted under 35 U.S.C. 154(b) by 0 days.

(21) Appl. No.: 17/330,869

(22) Filed: May 26, 2021

(65) Prior Publication Data

US 2021/0387629 A1 Dec. 16, 2021

Related U.S. Application Data

(60) Provisional application No. 63/037,860, filed on Jun. 11, 2020.

(51) Int. Cl.
| | |
|---|---|
| *B60W 40/09* | (2012.01) |
| *B60W 30/18* | (2012.01) |
| *G07C 5/00* | (2006.01) |

(52) U.S. Cl.
CPC ...... *B60W 40/09* (2013.01); *B60W 30/18109* (2013.01); *G07C 5/006* (2013.01); *B60W 2510/0638* (2013.01)

(58) Field of Classification Search
USPC .................................................. 701/1
See application file for complete search history.

(56) References Cited

U.S. PATENT DOCUMENTS

| | | |
|---|---|---|
| 6,749,269 B1 | 6/2004 | Niwa |
| 6,778,074 B1 | 8/2004 | Cuozzo |

(Continued)

FOREIGN PATENT DOCUMENTS

| | | |
|---|---|---|
| CA | 2610548 | 5/2015 |
| CA | 2768484 | 6/2019 |

(Continued)

OTHER PUBLICATIONS

Transtex "E-Smart" Marketing Flyer http://transtex-llc.com/wp-content/uploads/2018/06/Transtex-MKTG-Flyer-E-SMART-Combo-Web-20180618.pdf. Published on the Internet by Transtex Jul. 23, 2018, 2 pages.

(Continued)

*Primary Examiner* — Tyler D Paige
(74) *Attorney, Agent, or Firm* — Tillman Wright, PLLC; Chad D. Tillman

(57) ABSTRACT

An automated method of controlling a speed of a vehicle includes identifying parameters of a driving instance of the vehicle; identifying a predetermined profile that is applicable to the driving instance based on the identified parameters; identifying a predetermined speed policy applicable to the driving instance based on the identified profile; and implementing the identified speed policy during the driving instance. The method may be repeated during the driving instance, whereby the speed policy that is implemented is automatically updated when one or more changes in the identified parameters cause a different predetermined speed policy to be identified. Parameter may include driver parameters (e.g., driver age and driver experience); vehicle parameters (e.g., vehicle age, mileage, and tire wear) tire maintenance information); behavior parameters (e.g., speed, acceleration, hard braking of the vehicle, following distance, swerving, and cornering); and circumstance parameters (Continued)

(e.g., time of day, road information, inclement weather, and traffic congestion).

20 Claims, 11 Drawing Sheets

(56) References Cited

U.S. PATENT DOCUMENTS

| | | | |
|---|---|---|---|
| 7,184,873 B1 | 2/2007 | Idsinga et al. | |
| 7,457,693 B2 | 11/2008 | Olsen et al. | |
| 8,000,877 B2 | 8/2011 | Aussillou | |
| 8,330,620 B2 | 12/2012 | Swoboda et al. | |
| 9,240,018 B2 | 1/2016 | Ricci | |
| 9,396,656 B2 | 7/2016 | Cazanas et al. | |
| 9,630,590 B2 | 4/2017 | Doherty et al. | |
| 9,971,348 B1 | 5/2018 | Canavor et al. | |
| 10,373,257 B1 | 8/2019 | Iqbal et al. | |
| 10,388,161 B2 | 8/2019 | Troutman et al. | |
| 10,392,023 B2 | 8/2019 | Maskell et al. | |
| 10,593,205 B1 | 3/2020 | Jones | |
| 11,572,067 B2 | 2/2023 | Poulin | |
| 2001/0003808 A1 | 6/2001 | Jeon | |
| 2002/0065599 A1* | 5/2002 | Hameleers | G08G 1/09 701/117 |
| 2004/0212506 A1 | 10/2004 | Cherouny et al. | |
| 2006/0081697 A1 | 4/2006 | Brinton et al. | |
| 2007/0168125 A1 | 7/2007 | Petrik | |
| 2008/0270519 A1 | 10/2008 | Ekdahl et al. | |
| 2011/0137520 A1* | 6/2011 | Rector | H04W 28/18 455/418 |
| 2011/0160978 A1 | 6/2011 | Yuzawa et al. | |
| 2012/0215416 A1* | 8/2012 | Poulin | B60W 30/146 701/93 |
| 2012/0283928 A1 | 11/2012 | Bjernetun et al. | |
| 2013/0157647 A1 | 6/2013 | Kolodziej | |
| 2013/0164715 A1* | 6/2013 | Hunt | G09B 9/052 434/65 |
| 2014/0046585 A1 | 2/2014 | Morris, IV et al. | |
| 2014/0282917 A1 | 9/2014 | Peckover | |
| 2015/0120178 A1 | 4/2015 | Kleve et al. | |
| 2015/0246676 A1 | 9/2015 | Keren | |
| 2015/0355637 A1 | 12/2015 | Morisset | |
| 2017/0068245 A1 | 3/2017 | Scofield et al. | |
| 2018/0130095 A1 | 5/2018 | Khoury | |
| 2018/0210446 A1 | 7/2018 | Canavor et al. | |
| 2018/0308295 A1* | 10/2018 | Kwak | G06F 9/453 |
| 2018/0357841 A1 | 12/2018 | McQuade | |
| 2019/0016341 A1 | 1/2019 | Nelson | |
| 2019/0339692 A1 | 11/2019 | Sakai et al. | |
| 2019/0383627 A1 | 12/2019 | Nangeroni | |
| 2020/0104790 A1 | 4/2020 | Chung | |
| 2020/0156630 A1 | 5/2020 | Schmidt et al. | |
| 2020/0294401 A1 | 9/2020 | Kerecsen | |
| 2021/0031765 A1 | 2/2021 | Poulin et al. | |
| 2021/0031782 A1 | 2/2021 | Poulin et al. | |
| 2021/0061273 A1 | 3/2021 | Poulin et al. | |

FOREIGN PATENT DOCUMENTS

| | | |
|---|---|---|
| JP | 60163735 | 8/1985 |
| WO | 2006015425 A1 | 2/2006 |
| WO | 2019043446 A1 | 3/2019 |

OTHER PUBLICATIONS

Machine translation of JP 60163735 A retrieved from JPatPlat on Jun. 30, 2022, 10 pages.

* cited by examiner

CREATE PROFILE

*Profile Name*

[_____]   ( Save )   ( Cancel )

DRIVER

*Age (years)*
☐ 18 to 24   ☐ 25 to 34   ☐ 35 to 44   ☐ 45 to 54   ☐ 55 to 64   ☐ 65 to 74

*Experience (years of experience as a commercial driver)*
☐ trainee   ☐ 1 to 3   ☐ 4 to 6   ☐ 7 to 9   ☐ 10 to 20   ☐ 20+

*Total Number of Citations (lifetime total number of citations)*
☐ none   ☐ 1 to 3   ☐ 4 to 6   ☐ 7 to 9   ☐ 10 to 20   ☐ 20+

*Rate of Citations (number of citations received over last 12/24/36 months)*
☐ 0  ☐ 1  ☐ 2  ☐ 3+  /  ☐ 0  ☐ 1  ☐ 2  ☐ 3+  /  ☐ 0  ☐ 1  ☐ 2  ☐ 3+

VEHICLE

*Age (years)*
☐ 0 to 3   ☐ 4 to 7   ☐ 8 to 11   ☐ 12 to 15   ☐ 15+

*Mileage (miles)*
☐ 0 to 15,000   ☐ 15,000 to 30,000   ☐ 30,000 to 45,000   ☐ 45,000+

*Maintenance (engine)*
☐ excellent   ☐ good   ☐ fair   ☐ poor

*Maintenance (brakes)*
☐ excellent   ☐ good   ☐ fair   ☐ poor

*Maintenance (tires)*
☐ excellent   ☐ good   ☐ fair   ☐ poor

CIRCUMSTANCE

*Time of Day*
☐ 6 am to 10 am   ☐ 10 am to 2 pm   ☐ 2 pm to 6 pm   ☐ 6 pm to 12 am   ☐ 12 am to 6 am

*Road*
☐ unpaved   ☐ secondary   ☐ highway, 2 lane   ☐ highway, 4 lane   ☐ interstate

*Inclement Weather*
☐ rain   ☐ snow/ice   ☐ high wind   ☐ lightning   ☐ flooding   ☐ tornado warning

*Traffic Congestion*
☐ light traffic   ☐ moderate traffic   ☐ heavy traffic   ☐ stop-and-go traffic

BEHAVIOR

*Speed (average relative speed to speed zones)*
☐ 9 mph to 0 under speed limit   ☐ 0 to 9 mph over speed limit   ☐ 10+ mph over speed limit

*Acceleration (typical)*
☐ light   ☐ moderate   ☐ high

*Hard Braking (typical)*
☐ rare   ☐ occassional   ☐ constantly

*Following Distance (typical)*
☐ following too closely   ☐ maintaining distance   ☐ lagging behind

*Cornering (typical)*
☐ light lateral acceleration   ☐ moderate lateral acceleration   ☐ high lateral acceleration

*FIG. 6*

CREATE SPEED POLICY

*Speed Policy Name*

Speed Policy #1

| *Speed Zone* | | *Top Speed* | | |
|---|---|---|---|---|
| 5 | mph | 5 | mph | *Max Speed (mph)* |
| 10 | mph | 10 | mph | 70 |
| 15 | mph | 15 | mph | *Overspeed (mph)* |
| 20 | mph | 20 | mph | 5 |
| 25 | mph | 20 | mph | |
| 30 | mph | 25 | mph | *Overspeed (%)* |
| 35 | mph | 30 | mph | 10 |
| 40 | mph | 35 | mph | *Overspeed duration (mins)* |
| 45 | mph | 40 | mph | 5 |
| 50 | mph | 45 | mph | |
| 55 | mph | 50 | mph | |
| 60 | mph | 55 | mph | |
| 65 | mph | 60 | mph | |
| 70 | mph | 65 | mph | |
| 75 | mph | 70 | mph | |
| 80 | mph | 70 | mph | |

( Save )  ( Cancel )

ASSOCIATE PROFILE TO SPEED POLICY   118

*Select Profile*          *Select Speed Policy*

[▽]                       [▽]

116

( Save )  ( Cancel )

```
{
    "SpeedLimit_MPH_15":15,
    "SpeedLimit_MPH_20":20,
    "SpeedLimit_MPH_25":25,
    "SpeedLimit_MPH_30":30,
    "SpeedLimit_MPH_35":35,
    "SpeedLimit_MPH_40":40,
    "SpeedLimit_MPH_45":45,
    "SpeedLimit_MPH_50":50,
    "SpeedLimit_MPH_55":55,
    "SpeedLimit_MPH_60":60,
    "SpeedLimit_MPH_65":65,
    "SpeedLimit_MPH_70":70,
    "SpeedLimit_MPH_75":70,
    "SpeedLimit_MPH_80":70
}
```

FIG. 19

```
{
    "experience": "trainee"
}
```

FIG. 20

```
POST https://existing_orgnization_site/api_to_fetch_vehicle_info
{
    "VIN": "3HSDZAPR2LN849700*"
}
```

FIG. 21

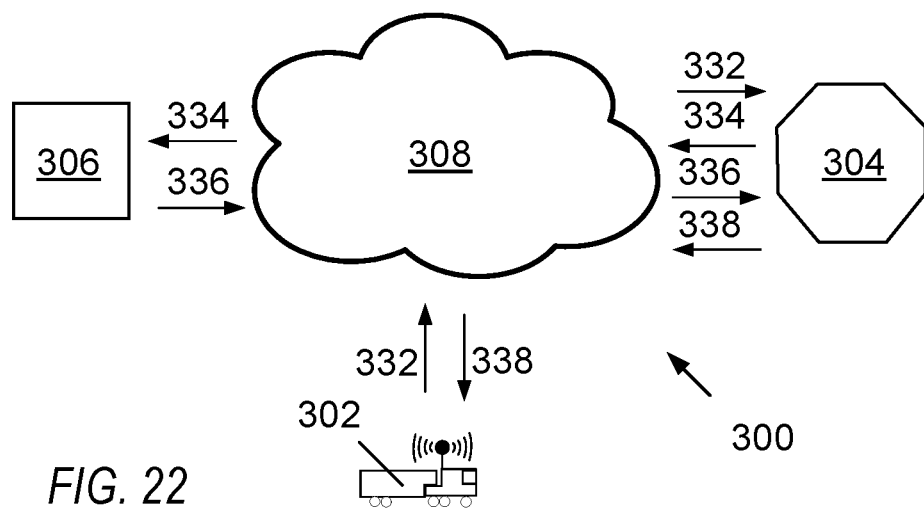

FIG. 22

USING ISA SYSTEM TO IMPLEMENT A SPEED POLICY IDENTIFIED BASED ON PROFILE OF A DRIVING INSTANCE

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to controlling a speed of a vehicle and, in particular, to limiting a speed of a fleet vehicle, like a truck or tractor trailer, or other commercial vehicles.

Generally, it is believed that one speed policy is used across an entire organization for controlling vehicular speeds of the organization's vehicle fleet. Such a speed policy usually consists of a maximum top speed (top governor) for all the vehicles in the fleet.

It is believed that an advantage could be realized by having a plurality of different speed policies for use with vehicles in an organization's fleet wherein a speed policy that is used would depend upon the particular driving instance in which it was used. One or more aspects, features, and embodiment of the invention are believed to provide such advantage.

SUMMARY OF THE INVENTION

The invention includes many aspects and features. Moreover, while many aspects and features relate to, and are described in, the context of fleet management in the commercial trucking industry, the invention is not limited to use only in such context, as will become apparent from the following summaries and detailed descriptions of aspects, features, and one or more embodiments of the invention.

Accordingly, in one aspect of the invention, an automated method of controlling a speed of a vehicle comprises the steps of: (a) identifying parameters of a driving instance of a vehicle; (b) identifying a predetermined profile that is applicable to the driving instance of the vehicle based on the identified parameters; (c) identifying a predetermined speed policy applicable to the driving instance of the vehicle based on the identified profile; and (d) implementing the identified speed policy during the driving instance. In a feature, this method further comprises repeating steps (a) through (d) during the driving instance, whereby the implemented speed policy is automatically updated when one or more changes in the identified parameters cause a different predetermined speed policy to be identified.

In another aspect, an automated method of controlling a speed of a vehicle having an intelligent speed adaptation system comprises the steps of: (a) identifying parameters of a driving instance of the vehicle; (b) identifying a predetermined profile that is applicable to the driving instance of the vehicle based on the identified parameters; (c) identifying a predetermined speed policy applicable to the driving instance of the vehicle based on the identified profile; and (d) implementing the identified speed policy during the driving instance using the intelligent speed adaptation system of the vehicle. In a feature, the method further comprises repeating steps (a) through (d) during the driving instance, whereby the implemented speed policy is automatically updated when one or more changes in the identified parameters cause a different predetermined speed policy to be identified.

In another aspect, an automated method of controlling a speed of a vehicle having an intelligent speed adaptation system comprises the steps of: (a) identifying, at the vehicle using one or more sensors, behavior parameters during a driving instance of the vehicle; (b) communicating, from the vehicle, the identified behavior parameters; (c) based on the identified behavior parameters, identifying a predetermined profile that is applicable to the driving instance of the vehicle; (d) based on the identified profile, identifying a predetermined speed policy that is applicable to the driving instance of the vehicle; (e) communicating, to the vehicle, the identified speed policy; and (f) implementing, during the driving instance using the intelligent speed adaptation system of the vehicle, the identified speed policy communicated to the vehicle.

In another aspect, an automated method of controlling a speed of a vehicle having an intelligent speed adaptation system comprises the steps of: (a) identifying an identification of the vehicle; (b) identifying, at the vehicle using one or more sensors, a location of the vehicle during a driving instance of the vehicle; (c) identifying, at the vehicle using one or more sensors, behavior parameters during the driving instance of the vehicle; (d) communicating, from the vehicle, the identification, the location, and the behavior parameters; (e) based on the identification, identifying vehicle parameters; (f) based on the location, identifying circumstance parameters of the driving instance of the vehicle; (g) based on the identified circumstance parameters, the identified vehicle parameters, and the identified behavior parameters, identifying a predetermined profile that is applicable to the driving instance of the vehicle; (h) based on the identified profile, identifying a predetermined speed policy that is applicable to the driving instance of the vehicle; (i) communicating, to the vehicle, the identified speed policy; and (j) implementing, at the vehicle using the intelligent speed adaptation system of the vehicle, the identified speed policy communicated to the vehicle.

In another aspect, an automated method of controlling a speed of a vehicle having an intelligent speed adaptation system comprises the steps of: (a) identifying an identification of a driver of the vehicle; (b) identifying, at the vehicle using one or more sensors, a location of the vehicle during a driving instance of the vehicle; (c) identifying, at the vehicle using one or more sensors, behavior parameters during the driving instance of the vehicle; (d) communicating, from the vehicle, the identification, the location, and the behavior parameters; (e) based on the identification, identifying driver parameters; (f) based on the location, identifying circumstance parameters of the driving instance of the vehicle; (g) based on the identified circumstance parameters, the identified driver parameters, and the identified behavior parameters, identifying a predetermined profile that is applicable to the driving instance of the vehicle; (h) based on the identified profile, identifying a predetermined speed policy that is applicable to the driving instance of the vehicle; (i) communicating, to the vehicle, the identified speed policy; and (j) implementing, at the vehicle using the intelligent speed adaptation system of the vehicle, the identified speed policy communicated to the vehicle.

In another aspect, an automated method of controlling a speed of a vehicle having an intelligent speed adaptation system comprises the steps of: (a) identifying an identification of the vehicle; (b) identifying an identification of the vehicle; (c) identifying, at the vehicle using one or more sensors, a location of the vehicle during a driving instance of the vehicle; (d) identifying, at the vehicle using one or more sensors, behavior parameters during the driving instance of the vehicle; (e) communicating, from the vehicle, the vehicle identification, the driver identification, the location, and the behavior parameters; (f) based on the vehicle identification, identifying vehicle parameters; (g) based on the driver identification, identifying driver parameters; (h) based on the location, identifying circumstance parameters of the driving instance of the vehicle; (i) based on the identified circumstance parameters, the identified vehicle parameters, the identified driver parameters, and the identified behavior parameters, identifying a predetermined profile that is applicable to the driving instance of the vehicle; (j) based on the identified profile, identifying a predetermined speed policy that is applicable to the driving instance of the vehicle; (k) communicating, to the vehicle, the identified speed policy; and (1) implementing, at the vehicle using the intelligent speed adaptation system of the vehicle, the identified speed policy communicated to the vehicle.

In yet another aspect, an automated method of controlling a speed of a vehicle that is performed at the vehicle comprises the steps of: (a) identifying parameters of a driving instance of the vehicle; (b) wirelessly transmitting, from the vehicle, the identified parameters; (c) wirelessly receiving, at the vehicle, a speed policy that is identified based on the transmitted parameters; and (d) implementing the identified speed policy. In a feature, the method further comprises repeating steps (a) through (d), whereby the implemented speed policy is automatically updated when one or more changes in the identified parameters cause a different predetermined speed policy to be identified.

In another aspect, an automated method of controlling a speed of a vehicle having an intelligent speed adaptation system comprises the steps of: (a) identifying parameters of a driving instance of the vehicle during the driving instance of the vehicle; (b) wirelessly transmitting, from the vehicle during the driving instance, the identified parameters; (c) wirelessly receiving, at the vehicle during the driving instance, a speed policy that is applicable to the driving instance based on the transmitted parameters; and (d) implementing the identified speed policy received during the driving instance using the intelligent speed adaptation system of the vehicle. In a feature of this aspect, the method further comprises repeating steps (a) through (d) during the driving instance, whereby the implemented speed policy is automatically updated when one or more changes in the identified parameters cause a different predetermined speed policy to be identified.

In another aspect, an automated method of controlling a speed of a vehicle having an intelligent speed adaptation system comprises the steps of: (a) identifying, at the vehicle using one or more sensors during a driving instance of the vehicle, behavior parameters of the driving instance; (b) wirelessly transmitting, from the vehicle during the driving instance, the behavior parameters; (c) wirelessly receiving, at the vehicle during the driving instance, a speed policy that is applicable to the driving instance based on the communicated behavior parameters; and (d) implementing, during the driving instance using the intelligent speed adaptation system, the applicable speed policy that was communicated to the vehicle.

In another aspect, an automated method of controlling a speed of a vehicle having an intelligent speed adaptation system comprises the steps of: (a) identifying an identification of the vehicle; (b) identifying, at the vehicle using one or more sensors during a driving instance of the vehicle, a location of the vehicle; (c) identifying, at the vehicle using one or more sensors during a driving instance of the vehicle, behavior parameters of the driving instance; (d) wirelessly transmitting, from the vehicle during the driving instance, the identification of the vehicle, the location of the vehicle, and the behavior parameters of the driving instance; (e) wirelessly receiving, at the vehicle of the driving instance, a speed policy that is applicable to the driving instance of the vehicle based on the communicated identification of the vehicle, the communicated location of the vehicle, and the communicated behavior parameters; and (f) implementing, during the driving instance using the intelligent speed adaptation system, the applicable speed policy that was communicated to the vehicle.

In another aspect, an automated method of controlling a speed of a vehicle having an intelligent speed adaptation system comprises the steps of: (a) identifying an identification of the driver; (b) identifying, at the vehicle using one or more sensors during a driving instance of the vehicle, a location of the vehicle; (c) identifying, at the vehicle using one or more sensors during a driving instance of the vehicle, behavior parameters of the driving instance; (d) wirelessly transmitting, from the vehicle during the driving instance, the identification of the driver, the location of the vehicle, and the behavior parameters of the driving instance; (e) wirelessly receiving, at the vehicle of the driving instance, a speed policy that is applicable to the driving instance of the vehicle based on the communicated identification of the driver, the communicated location of the vehicle, and the communicated behavior parameters; and (f) implementing, during the driving instance using the intelligent speed adaptation system, the applicable speed policy that was communicated to the vehicle.

In another aspect, an automated method of controlling a speed of a vehicle having an intelligent speed adaptation system comprises the steps of: (a) identifying an identification of the vehicle; (b) identifying an identification of the driver; (c) identifying, at the vehicle using one or more sensors during a driving instance of the vehicle, a location of the vehicle; (d) identifying, at the vehicle using one or more sensors during a driving instance of the vehicle, behavior parameters of the driving instance; (e) wirelessly transmitting, from the vehicle during the driving instance, the identification of the vehicle, the identification of the driver, the location of the vehicle, and the behavior parameters of the driving instance; (f) wirelessly receiving, at the vehicle of the driving instance, a speed policy that is applicable to the driving instance of the vehicle based on the communicated identification of the vehicle, the communicated identification of the driver, the communicated location of the vehicle, and the communicated behavior parameters; and (g) implementing, during the driving instance using the intelligent speed adaptation system, the applicable speed policy that was communicated to the vehicle.

In a feature of each of the foregoing aspects, the method further comprises continuing to identify and communicate parameters of the driving instance, and implementing further speed policies at the vehicle during the driving instance when and as further speed policies are received at the vehicle.

In a feature of each of the foregoing aspects that includes the step of identifying, at the vehicle, behavior parameters of the driving instance of the vehicle, said step comprises determining a speed of the vehicle during the driving instance.

In a feature of each of the foregoing aspects that includes the step of identifying, at the vehicle, behavior parameters of the driving instance of the vehicle, said step comprises determining an acceleration of the vehicle during the driving instance.

In a feature of each of the foregoing aspects that includes the step of identifying, at the vehicle, behavior parameters of the driving instance of the vehicle, said step comprises determining a lateral acceleration of the vehicle during the driving instance.

In a feature of each of the foregoing aspects that includes the step of identifying, at the vehicle, behavior parameters of the driving instance of the vehicle, said step comprises determining a deceleration of the vehicle during the driving instance.

In a feature of each of the foregoing aspects that includes the step of identifying, at the vehicle, behavior parameters of the driving instance of the vehicle, said step comprises determining a following distance of the vehicle to another vehicle during the driving instance.

In a feature of each of the foregoing aspects that includes the step of identifying, at the vehicle, behavior parameters of the driving instance of the vehicle using one or more sensors, the one or more sensors comprise an accelerometer. Such one or more sensors may comprise a speed sensor, a distance sensor, a proximity sensor, a radar sensor, an optical sensor, a lidar sensor, and a camera.

In a feature of each of the foregoing aspects that includes the implementing step, such step comprises limiting the vehicle from exceeding a maximum speed that is specified in the identified speed policy.

In a feature of each of the foregoing aspects that includes the implementing step, such step comprises limiting the vehicle from exceeding a certain speed for a particular speed limit zone that is specified in the identified speed policy. The certain speed for a particular speed limit zone may comprise a top speed or a top speed plus an overspeed. Moreover, it will be appreciated that the top speed within a particular speed limit zone may be significantly less than the posted speed limit. For example, during inclement weather, a speed policy may be identified and implemented in which the top speed is 25% less than the top speed would be in a different speed policy that would have been implemented but for the inclement weather.

In a feature of each of the foregoing aspects that includes identifying behavior parameters for a vehicle during the driving instance, the behavior parameters comprise at least one of speed of the vehicle, acceleration of the vehicle, hard braking of the vehicle, following distance of the vehicle, and cornering of the vehicle.

In a feature of each of the foregoing aspects that includes identifying vehicle parameters for a vehicle during the driving instance, the vehicle parameters for the driving instance comprise at least one of age of the vehicle, mileage of the vehicle, engine maintenance information of the vehicle, brake maintenance information of the vehicle, and tire maintenance information of the vehicle.

In a feature of each of the foregoing aspects that includes identifying circumstance parameters for a vehicle during the driving instance, the circumstance parameters for the driving instance comprise at least one of time of day of the driving instance, road information associated with the driving instance, inclement weather associated with the driving instance, and traffic congestion associated with the driving instance.

In a feature of each of the foregoing aspects that includes identifying driver parameters for a vehicle during the driving instance, the driver parameters for the driving instance comprise at least one of age of the driver, experience of the driver, number of citations accumulated by the driver, and rate of citations accumulated by the driver over predetermined periods of time.

In a feature of the foregoing aspects, the applicable profile is identified out of a plurality of predetermined profiles.

In a feature of the foregoing aspects, the applicable policy is identified out of a plurality of predetermined policies based on the identified profile. Further in this regard, there may be a one-to-one mapping of at least one profile to a policy, and there may be a many-to-one mapping of at least some profiles to a policy.

In a feature of the foregoing aspects, a predetermined profile specifies mutually exclusive groupings for each of a plurality of parameters, and a predetermined profile is identified based on the profile for which the highest number of identified parameters of the driving instance are members of the specified groupings. The specified grouping for a parameter may be qualitatively or quantitative.

In a feature of the foregoing aspects, a predetermined speed policy specifies top speeds of the vehicle for a plurality of speed limit zones. The predetermined speed policy further may specify an overspeed by which a vehicle is allowed to travel over the specified top speeds of the vehicle in speed limit zones. The overspeed may be specified by a speed or by a percentage.

In a feature of the foregoing aspects, the speed policy specifies a maximum duration of time during which the vehicle may travel over the specified top speeds.

In a feature of the foregoing aspects, a predetermined speed policy specifies a maximum speed of the vehicle.

In yet another aspect, an automated method of providing a speed policy for controlling a speed of a vehicle having an intelligent speed adaptation system during a driving instance of the vehicle comprises the steps of: (a) receiving parameters of the driving instance that are identified at and communicated from the vehicle; (b) identifying a predetermined profile that is applicable to the driving instance of the vehicle based on the communicated parameters of the driving instance; (c) identifying a predetermined speed policy that is applicable to the driving instance based on the identified profile; and (d) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle comprises the steps of: (a) receiving behavior parameters of the driving instance that are identified at and communicated from the vehicle; (b) identifying a predetermined profile that is applicable to the driving instance of the vehicle based on the communicated behavior parameters of the driving instance; (c) identifying a predetermined speed policy that is applicable to the driving instance based on the identified profile; and (d) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle comprises the steps of: (a) receiving a location of the vehicle, an identification of the vehicle, and behavior parameters of the driving instance of the vehicle that are identified at and communicated from the vehicle; (b) identifying circumstance parameters based on the received location of the vehicle; (c) identifying vehicle parameters based on the identification of the vehicle; (d) identifying a predetermined profile that is applicable to the driving instance of the vehicle based on the identified circumstance parameters, the identified vehicle parameters, and the communicated behavior parameters; (e) identifying a predetermined speed policy that is applicable to the driving instance based on the identified profile; and (f) communicating, to the vehicle, the identified speed policy applicable to the driving instance for implementation using the intelligent speed adaptation system.

In another aspect of the invention, an automated method of providing a speed policy for controlling a speed of a vehicle having an intelligent speed adaptation system during a driving instance of the vehicle comprises the steps of: (a) receiving a location of the vehicle, an identification of the driver, and behavior parameters of the driving instance of the vehicle that are identified at and communicated from the vehicle; (b) identifying circumstance parameters based on the received location of the vehicle; (c) identifying driver parameters based on the identification of the driver; (d) identifying a predetermined profile that is applicable to the driving instance of the vehicle based on the circumstance parameters, the identified driver parameters, and the communicated behavior parameters; (e) identifying a predetermined speed policy that is applicable to the driving instance based on the identified profile; and (f) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle comprises the steps of: (a) receiving a location of the vehicle, an identification of the driver, and behavior parameters of the driving instance of the vehicle that are identified at and communicated from the vehicle; (b) identifying circumstance parameters based on the received location of the vehicle; (c) identifying driver parameters based on the identification of the driver; (d) identifying vehicle parameters based on the identification of the vehicle; (e) identifying a predetermined profile that is applicable to the driving instance of the vehicle based on the circumstance parameters, the identified driver parameters, the identified vehicle parameters, and the communicated behavior parameters; (f) identifying a predetermined speed policy that is applicable to the driving instance based on the identified profile; and (g) communicating, to the vehicle, the identified speed policy applicable to the driving instance for implementation using the intelligent speed adaptation system.

In a feature, the step of identifying driver parameters based on the identification of the driver comprises communicating the identification of the driver and receiving back the driver parameters for the driver. The identification of the driver may be communicated to an organization that employs the driver.

In a feature, the step of identifying vehicle parameters based on the identification of the vehicle comprises communicating the identification of the vehicle and receiving back the vehicle parameters for the vehicle. The identification of the vehicle may be communicated to an organization that maintains the vehicle.

In another feature, the method further comprises continuing to receive locations of the vehicle, the identification of the driver, the identification of the vehicle, and behavior parameters of the driving instance, identifying predetermined profiles and corresponding speed policies, and communicating those speed policies to the vehicle.

In still another aspect of the invention, an automated method of providing a speed policy for controlling a speed of a vehicle having an intelligent speed adaptation system during a driving instance of the vehicle comprises the steps of: (a) receiving parameters of the driving instance that are identified at and communicated from the vehicle; (b) identifying a predetermined profile that is applicable to the driving instance of the vehicle based on the communicated parameters of the driving instance; (c) identifying a predetermined speed policy that is applicable to the driving instance based on the identified profile; and (d) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle comprises the steps of: (a) receiving behavior parameters of the driving instance that are identified at and communicated from the vehicle; (b) identifying a predetermined profile that is applicable to the driving instance of the vehicle based on the communicated behavior parameters of the driving instance; (c) identifying a predetermined speed policy that is applicable to the driving instance based on the identified profile; and (d) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle comprises the steps of: (a) receiving a location of the vehicle, an identification of the vehicle, and behavior parameters of the driving instance of the vehicle that are identified at and communicated from the vehicle; (b) identifying circumstance parameters based on the received location of the vehicle; (c) identifying vehicle parameters based on the identification of the vehicle; (d) identifying a predetermined profile that is applicable to the driving instance of the vehicle based on the identified circumstance parameters, the identified vehicle parameters, and the communicated behavior parameters; (e) identifying a predetermined speed policy that is applicable to the driving instance based on the identified profile; and (f) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle, comprising the steps of: (a) receiving a location of the vehicle, an identification of the driver, and behavior parameters of the driving instance of the vehicle that are identified at and communicated from the vehicle; (b) identifying circumstance parameters based on the received location of the vehicle; (c) identifying driver parameters based on the identification of the driver; (d) identifying a predetermined profile that is applicable to the driving instance of the vehicle based on the circumstance parameters, the identified driver parameters, and the communicated behavior parameters; (e) identifying a predetermined speed policy that is applicable to the driving instance based on the identified profile; and (f) communicating, to the vehicle, the identified speed policy applicable to the driving instance for implementation using the intelligent speed adaptation system.

In another aspect, an automated method of providing a speed policy for controlling a speed of a vehicle having an intelligent speed adaptation system during a driving instance of the vehicle, comprising the steps of: (a) receiving a location of the vehicle, an identification of the driver, and behavior parameters of the driving instance of the vehicle that are identified at and communicated from the vehicle; (b) identifying circumstance parameters based on the received location of the vehicle; (c) identifying driver parameters based on the identification of the driver; (d) identifying vehicle parameters based on the identification of the vehicle; (e) identifying a predetermined profile that is applicable to the driving instance of the vehicle based on the circumstance parameters, the identified driver parameters, the identified vehicle parameters, and the communicated behavior parameters; (f) identifying a predetermined speed policy that is applicable to the driving instance based on the identified profile; and (g) communicating, to the vehicle, the identified speed policy applicable to the driving instance for implementation using the intelligent speed adaptation system.

In a feature of this aspect, identifying driver parameters based on the identification of the driver comprises communicating the identification of the driver and receiving back the driver parameters for the driver. Communicating the identification of the driver may comprise communicating the identification of the driver to an organization that employs the driver.

In a feature of this aspect, identifying vehicle parameters based on the identification of the vehicle comprises communicating the identification of the vehicle and receiving back the vehicle parameters for the vehicle. Communicating the identification of the vehicle may comprise communicating the identification of the vehicle to an organization that maintains the vehicle.

In another feature, the method further comprises continuing to receive locations of the vehicle, the identification of the driver, the identification of the vehicle, and behavior parameters of the driving instance, identifying predetermined profiles and corresponding speed policies, and communicating those speed policies to the vehicle.

In still another aspect, an automated method of facilitating the providing of a speed policy for controlling a speed of a vehicle having an intelligent speed adaptation system during a driving instance of the vehicle comprises the steps of: (a) receiving, from a sender, an identification of the driver of the vehicle that has been identified at and communicated from the vehicle; and (b) in response, (i) identifying driver parameters based on the identification of the driver, and (ii) communicating the identified driver parameters back to the sender.

In another aspect, an automated method of facilitating the providing of a speed policy for controlling a speed of a vehicle during a driving instance of the vehicle comprises the steps of: (a) receiving, from a sender, an identification of the vehicle that has been identified at and communicated from the vehicle; and (b) in response, (i) identifying vehicle parameters based on the identification of the vehicle, and (ii) communicating the identified vehicle parameters back to the sender.

In another aspect, an automated method of facilitating the providing of a speed policy for controlling a speed of a vehicle having an intelligent speed adaptation system during a driving instance of the vehicle comprises the steps of: (a) receiving, from a sender, (i) an identification of the driver of the vehicle that has been identified at and communicated from the vehicle and (ii) an identification of the vehicle that has been identified at and communicated from the vehicle; and (b) in response, (i) identifying driver parameters based on the identification of the driver, (ii) identifying vehicle parameters based on the identification of the vehicle, and (iii) communicating the identified driver parameters and the identified vehicle parameters back to the sender.

In still another aspect of the invention, a system in which a speed policy is used for controlling a speed of a vehicle during a driving instance of the vehicle comprises: (a) a vehicle comprising sensors configured to measure behavior parameters during an instance of driving the vehicle and wirelessly communicate the behavior parameters from the vehicle; and (b) a networked computer system (i) configured to receive the behavior parameters and identify a predetermined profile that is applicable to the driving instance of the vehicle based on the received behavior parameters, (ii) configured to identify a predetermined speed policy that is applicable to the driving instance based on the identified profile, and (iii) configured to communicate, to the vehicle, the identified speed policy applicable to the driving instance; (c) wherein the vehicle further comprises a speed control system configured to implement the communicated speed policy applicable to the driving instance, whereby the speed of the vehicle is limited. Preferably the networked computer system includes a web portal for access by users to create profiles, create speed policies, and create associations between the profiles and policies.

In another aspect of the invention, a system in which a speed policy is used for controlling a speed of a vehicle having an intelligent speed adaptation system during a driving instance of the vehicle comprises: (a) a vehicle comprising sensors configured to measure behavior parameters during an instance of driving the vehicle and wirelessly communicate the behavior parameters from the vehicle, a location of the vehicle, and an identification of the vehicle; and (b) a networked computer system (i) configured to receive the behavior parameters, the location of the vehicle, and the identification of the vehicle, (ii) configured to identify circumstance parameters based on the vehicle location, (iii) configured to identify vehicle parameters based on the vehicle identification, (iv) configured to identify a predetermined profile that is applicable to the driving instance based on the received behavior parameters, the identified circumstance parameters, and the identified vehicle parameters, (v) configured to identify a predetermined speed policy that is applicable to the driving instance based on the identified profile, and (vi) configured to communicate, to the vehicle, the identified speed policy applicable to the driving instance; (c) wherein the vehicle further comprises a speed control system configured to receive and implement the communicated speed policy applicable to the driving instance, whereby the speed of the vehicle is limited. Preferably the networked computer system includes a web portal for access by users to create profiles, create speed policies, and create associations between the profiles and policies. Alternatively, the network computer system may create speed policies on its own in accordance with computer programming preferably including artificial intelligence.

In another aspect of the invention, a system in which a speed policy is used for controlling a speed of a vehicle having an intelligent speed adaptation system during a driving instance of the vehicle comprises: (a) a vehicle comprising sensors configured to measure behavior parameters during an instance of driving the vehicle and wirelessly communicate the behavior parameters from the vehicle, a location of the vehicle, and an identification of the driver; and (b) a networked computer system (i) configured to receive the behavior parameters, the location of the vehicle, and the identification of the driver, (ii) configured to identify circumstance parameters based on the vehicle location, (iii) configured to identify vehicle parameters based on the vehicle identification, (iv) configured to identify a predetermined profile that is applicable to the driving instance based on the received behavior parameters, the identified circumstance parameters, and the identified driver parameters, (v) configured to identify a predetermined speed policy that is applicable to the driving instance based on the identified profile, and (vi) configured to communicate, to the vehicle, the identified speed policy applicable to the driving instance; (c) wherein the vehicle further comprises a speed control system configured to receive and implement the communicated speed policy applicable to the driving instance, whereby the speed of the vehicle is limited.

Preferably the networked computer system includes a web portal for access by users to create profiles, create speed policies, and create associations between the profiles and policies.

In another aspect of the invention, a system in which a speed policy is used for controlling a speed of a vehicle having an intelligent speed adaptation system during a driving instance of the vehicle comprises: (a) a vehicle comprising sensors configured to measure behavior parameters during an instance of driving the vehicle and wirelessly communicate the behavior parameters from the vehicle, a location of the vehicle, an identification of the vehicle, and an identification of the driver; and (b) a networked computer system (i) configured to receive the behavior parameters, the location of the vehicle, and the identification of the driver, (ii) configured to identify circumstance parameters based on the vehicle location, (iii) configured to identify vehicle parameters based on the vehicle identification, (iv) configured to identify driver parameters based on the driver identification, (v) configured to identify a predetermined profile that is applicable to the driving instance based on the received behavior parameters, the identified circumstance parameters, the identified vehicle parameters, and the identified driver parameters, (vi) configured to identify a predetermined speed policy that is applicable to the driving instance based on the identified profile, and (vii) configured to communicate, to the vehicle, the identified speed policy applicable to the driving instance; (c) wherein the vehicle further comprises a speed control system configured to receive and implement the communicated speed policy applicable to the driving instance, whereby the speed of the vehicle is limited. Preferably the networked computer system includes a web portal for access by users to create profiles, create speed policies, and create associations between the profiles and policies.

In a feature, the system further comprises a second networked computer system configured to receive from the first mentioned networked computer system the vehicle identification, access vehicle parameters associated with the vehicle identification, and communicate in response the accessed vehicle parameters to the first mentioned networked computer system. The second networked computer system may be operated by the organization that maintains the vehicle, and the first mentioned networked computer system may be operated by a third-party service provider which provides the first mentioned networked computer system to the organization as a commercial offering.

In a feature, the system further comprises a second networked computer system configured to receive from the first mentioned networked computer system the driver identification, access driver parameters associated with the driver identification, and communicate in response the accessed driver parameters to the first mentioned networked computer system. The second networked computer system may be operated by the organization that employs the driver, and the first mentioned networked computer system may be operated by a third-party service provider which provides the first mentioned networked computer system to the organization as a commercial offering.

In still another aspect of the invention, a system in which speed policies are used for controlling vehicular speeds during driving instances comprises (a) a plurality of vehicles, each vehicle comprising sensors configured to measure behavior parameters during an instance of driving the vehicle and wirelessly communicate from the vehicle the behavior parameters, a location of the vehicle, an identification of the vehicle, and an identification of the driver; and (b) a networked computer system configured with respect to each driving instance to (i) receive the behavior parameters, the location of the vehicle, and the identification of the driver, (ii) identify circumstance parameters based on the vehicle location, (iii) configured to identify vehicle parameters based on the vehicle identification, (iv) configured to identify driver parameters based on the driver identification, (v) configured to identify a predetermined profile that is applicable to the driving instance based on the received behavior parameters, the identified circumstance parameters, the identified vehicle parameters, and the identified driver parameters, (vi) configured to identify a predetermined speed policy that is applicable to the driving instance based on the identified profile, and (vii) configured to communicate, to the vehicle, the identified speed policy applicable to the driving instance; (c) wherein each vehicle further comprises a speed control system configured during each driving instance to receive and implement a communicated speed policy applicable to the driving instance, whereby the speed of the vehicle is limited during the driving instance. Preferably the networked computer system includes a web portal for access by users to create profiles, create speed policies, and create associations between the profiles and policies.

In a feature, the system further comprises a plurality of additional networked computer systems each configured to receive, from the first mentioned networked computer system, a vehicle identification, access vehicle parameters associated with the received vehicle identification, and communicate in response the accessed vehicle parameters to the first mentioned networked computer system. The plurality of additional networked computer systems may be operated by organizations each of which maintains at least one of the plurality of vehicles, and the first mentioned networked computer system may be operated by a third-party service provider which provides the first mentioned networked computer system to each of the organizations as a commercial offering.

In a feature, the system further comprises a plurality of additional networked computer systems each configured to receive from the first mentioned networked computer system a driver identification, access driver parameters associated with the received driver identification, and communicate in response the accessed driver parameters to the first mentioned networked computer system. The plurality of additional networked computer systems may be operated by organizations each of which employs at least one of the drivers of the plurality of vehicles, and the first mentioned networked computer system may be operated by a third-party service provider which provides the first mentioned networked computer system to each of the organizations as a commercial offering.

In accordance with the forgoing systems, behavior parameters of a driving instance comprise at least one of speed of the vehicle, acceleration of the vehicle, hard braking of the vehicle, following distance of the vehicle, swerving of the vehicle, speeding, and cornering of the vehicle; vehicle parameters for a driving instance comprise at least one of age of the vehicle, mileage of the vehicle, engine maintenance information of the vehicle, brake maintenance information of the vehicle, and tire maintenance information of the vehicle; circumstance parameters for a driving instance comprise at least one of time of day of the driving instance, road information associated with the driving instance, inclement weather associated with the driving instance, and traffic congestion associated with the driving instance; and driver parameters for a driving instance comprise at least one of age of the driver, experience of the driver, number of citations accumulated by the driver, and rate of citations accumulated by the driver over predetermined periods of time.

Additionally, in accordance with the forgoing systems, the applicable profile is identified out of a plurality of predetermined profiles, and the applicable policy is identified out of a plurality of predetermined policies based on the identified profile. There may be a one-to-one mapping of at least one profile to a policy, and there may be a many-to-one mapping of at least some profiles to a policy.

Furthermore, in accordance with the forgoing systems, a predetermined profile specifies mutually exclusive groupings for each of a plurality of parameters, and a predetermined profile is identified based on the profile for which the highest number of identified parameters of a driving instance are members of the specified groupings. The specified grouping for a parameter may be either qualitatively or quantitative.

In accordance with the forgoing systems, a predetermined speed policy specifies top speeds of the vehicle for a plurality of speed limit zones. The predetermined speed policy further may specify an overspeed by which a vehicle is allowed to travel over the specified top speeds of the vehicle in speed limit zones; the overspeed may be specified by a speed or by a percentage. The speed policy further may specify a maximum duration of time during which the vehicle may travel over the specified top speeds.

In accordance with the forgoing systems, a predetermined speed policy may specify a maximum speed of the vehicle.

In at least some implementations, parameters that are considered in identifying an applicable profile do not include any driver parameters.

In at least some implementations, parameters that are considered in identifying an applicable profile do not include any circumstance parameters.

In at least some implementations, parameters that are considered in identifying an applicable profile do not include any vehicle parameters.

In at least some implementations, parameters that are considered in identifying an applicable profile include only behavior parameters to the exclusion of driver, vehicle, and circumstance parameters.

In at least some implementations, parameters that are considered in identifying an applicable profile include only driver parameters to the exclusion of behavior, vehicle, and circumstance parameters.

In at least some implementations, parameters that are considered in identifying an applicable profile include only vehicle parameters to the exclusion of behavior, driver, and circumstance parameters.

In at least some implementations, parameters that are considered in identifying an applicable profile include only circumstance parameters to the exclusion of behavior, vehicle, and driver parameters.

In yet another aspect of the invention, an automated method of controlling a speed of a vehicle having an intelligent speed adaptation system comprises the steps of: (a) identifying, at the vehicle using one or more sensors, behavior parameters during a driving instance of the vehicle; (b) based on the identified behavior parameters, identifying a predetermined profile that is applicable to the driving instance of the vehicle; (c) based on the identified profile, identifying a predetermined speed policy that is applicable to the driving instance of the vehicle; and (d) implementing, during the driving instance using the intelligent speed adaptation system, the identified speed policy.

In a feature, the method further comprises, as a preliminary step to said step (b), communicating to the vehicle predetermined profiles.

In a feature, the method further comprises, as a preliminary step to said step (b), determining one or more profiles at the vehicle.

In a feature, the method further comprises, as a preliminary step to said step (c), communicating to the vehicle predetermined speed policies.

In a feature, the method further comprises, as a preliminary step to said step (c), determining one or more speed policies at the vehicle.

In another feature, the method further comprises, repeating said steps (a) through (d) during the driving instance, whereby different predetermined speed polices are implemented during the driving instance.

In a feature, the parameters are behavior parameters.
In a feature, the parameters are circumstance parameters.
In a feature, the parameters are vehicle parameters.
In a feature, the parameters are driver parameters.

Additional aspects and features are further described in commonly owned U.S. patent applications 62/881,934; 62/881,935; and 62/894,218, the disclosure of each of which is incorporated herein by reference. The disclosure of U.S. Pat. No. 8,751,133 also is incorporated herein by reference. These incorporated disclosures relate to and disclose intelligent speed adaptation systems that may be adapted to implement the speed policies provided in accordance with the above aspects and features of the invention for controlling vehicular speeds.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings.

FIG. 6 is an illustration showing an exemplary graphical user interface of a program by which a profile is created in accordance with one or more aspects and features of the invention.

FIG. 7 is an illustration showing an exemplary graphical user interface of a program by which a speed policy is created in accordance with one or more aspects and features of the invention.

FIG. 8 is an illustration showing an exemplary graphical user interface of a program by which a selected profile is associated with a selected speed policy in accordance with one or more aspects and features of the invention.

FIG. 19 is an illustration of an exemplary message for communicating a speed policy in accordance with one or more aspects and features of the invention.

FIG. 20 is an illustration of an exemplary message for communicating a driver parameter, namely, driver experience, in accordance with one or more aspects and features of the invention.

FIG. 21 is an illustration of an exemplary message for a querying a networked computer system of an organization with a VIN in order to identify vehicle parameters in accordance with one or more aspects and features of the invention.

FIG. 22 is an illustration of an exemplary implementation of a system in accordance with one or more aspects and features of the invention.

DETAILED DESCRIPTION

Figure 1:
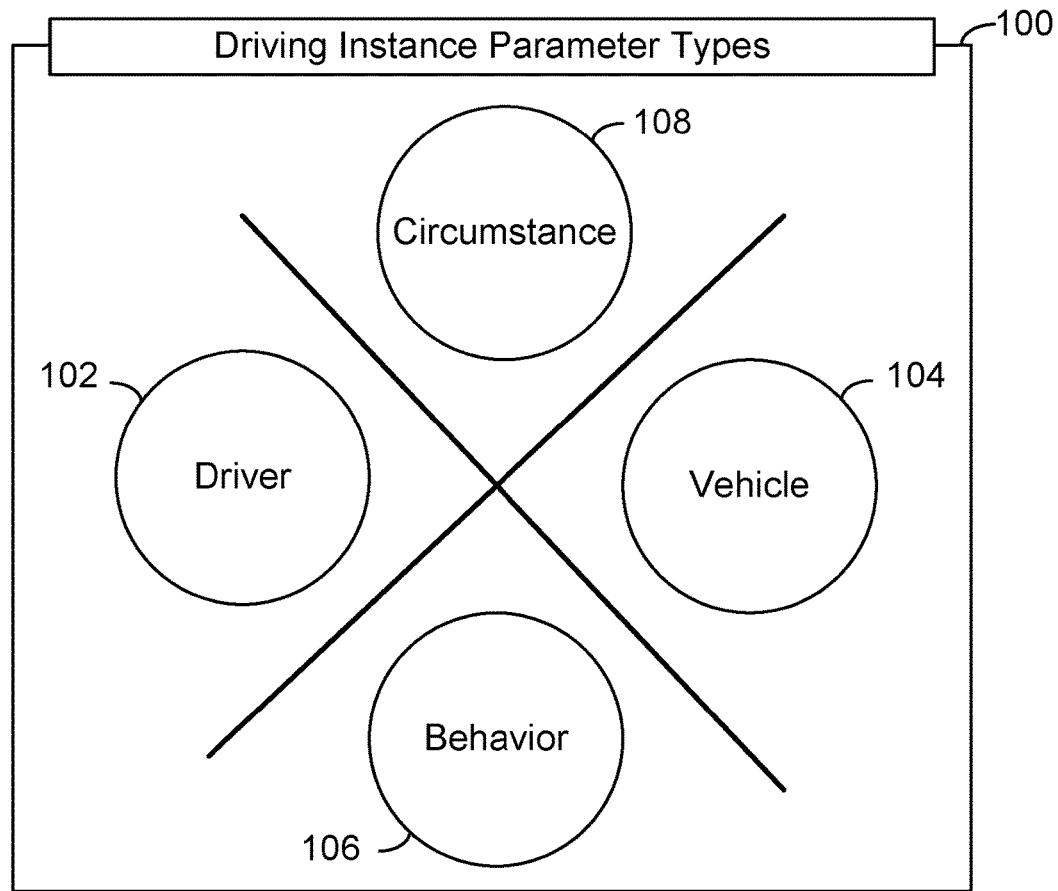
FIG. 1 is an illustration showing four types of parameters of a driving instance in accordance with one or more aspects and features of the invention.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

FIG. 1 is an illustration 100 showing four types of parameters of a driving instance in accordance with one or more aspects and features of the invention.

A "driving instance" as used herein is considered to be a duration of time between when a driver turns on a vehicle for driving and when the driver turns off the vehicle or the vehicle otherwise turns off. Turning on the vehicle can be deemed to begin when an engine is started. An exemplary communication that includes a message identifying an engine startup, the location, and a session identifier for the driving instance is seen at 204 in FIG. 17. Preferably, messages are sent using the MQTT messaging protocol. Alternatively, rather than triggering off of an engine startup, the beginning of a driving instance may be deemed to begin with an "ignition on" or "key on" event.

The four types of parameters are: "driver parameters" illustrated at 102; "vehicle parameters" illustrated at 104; "behavior parameters" 106; and "circumstance parameters" 108. All of these types of parameters are believed to be relevant in determining a speed by which to limit the vehicle during a particular driving instance. Another contemplated parameter type—but not shown in the drawings—comprises "fleet parameters" and includes, for example and not by way of limitation, equipment usage, operational capacity, and CSA percentile thresholds. Fleet parameters are outside of any particular driving instance but nonetheless may be relevant to the identification and implementation of preferred speed policies in driving instances.

Figures 2, 3, 4, 5:
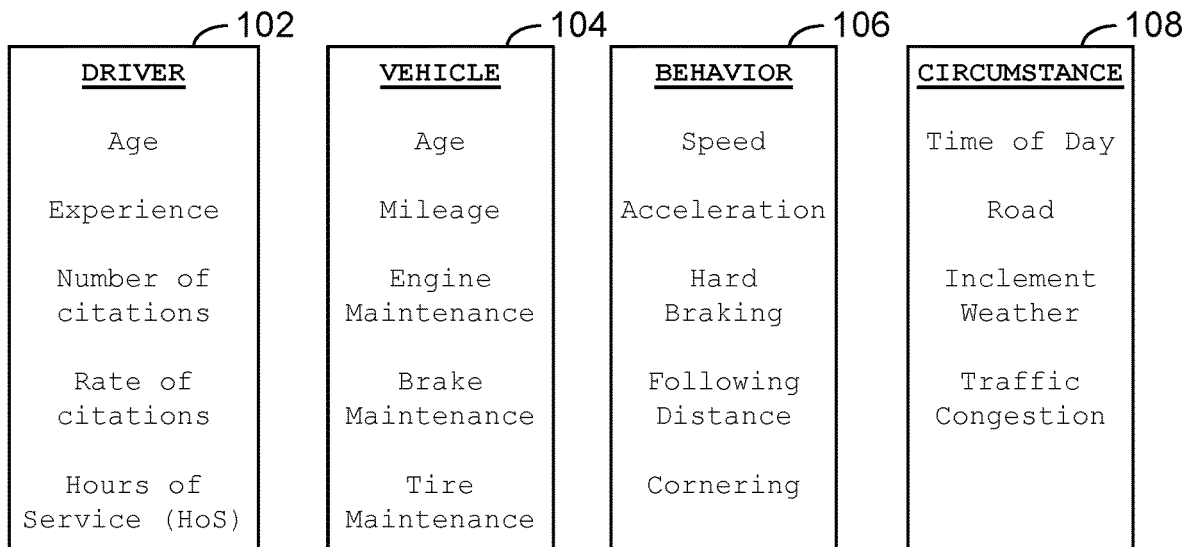
FIG. 2 is an illustration showing by way of example, and not limitation, various driver parameters in accordance with one or more aspects and features of the invention.
FIG. 3 is an illustration showing by way of example, and not limitation, various vehicle parameters in accordance with one or more aspects and features of the invention.
FIG. 4 is an illustration showing by way of example, and not limitation, various behavior parameters in accordance with one or more aspects and features of the invention.
FIG. 5 is an illustration showing by way of example, and not limitation, various circumstance parameters in accordance with one or more aspects and features of the invention.

FIG. 2 is an illustration showing by way of example, and not limitation, various driver parameters 102 in accordance with one or more aspects and features of the invention. The exemplary driver parameters include driver age; driver experience; the number of citations which the driver has received (especially citations relating to moving violations and traffic incidents); the rate of citations; and hours of service (HoS).

FIG. 3 is an illustration showing by way of example, and not limitation, various vehicle parameters 104 in accordance with one or more aspects and features of the invention. The exemplary vehicle parameters include vehicle age; vehicle mileage; vehicle engine maintenance; vehicle brake maintenance; and vehicle tire maintenance, including tire mileage.

FIG. 4 is an illustration showing by way of example, and not limitation, various behavior parameters 106 in accordance with one or more aspects and features of the invention. The exemplary behavior parameters relate to the driver's operation of the vehicle and include the speed at which the vehicle is driven relative to the applicable speed limit zone; the acceleration of the vehicle by the driver; the degree of hard braking; the distance at which the driver follows other vehicles; and the degree of lateral acceleration experienced when cornering by the driver.

FIG. 5 is an illustration showing by way of example, and not limitation, various circumstance parameters 108 in accordance with one or more aspects and features of the invention. The exemplary circumstance parameters relate to the circumstances under which the driver's operates the vehicle and include the time of day of the operation of the vehicle; the road on which the vehicle is operated (e.g., whether the road is a rural road, inner city road, highway, or interstate); the weather conditions at the location of operation of the vehicle (e.g., the extent and degree of inclement weather, including snowy or icy conditions); and the degree of traffic congestion at the location of operation of the vehicle.

These parameters can be used to define profiles for driving instances. FIG. 6 shows an exemplary graphical user interface 110 of a program by which a profile is created in accordance with one or more aspects and features of the invention. Creation of the profile entails a user assigning for a parameter one out of a plurality of predefined groupings relating to such parameter.

Thus, for example, the parameter regarding age of a driver is assigned to one of six mutually exclusive age-range groupings in creating a profile that is based, at least in part, on driver age. Similarly, the parameter regarding experience of a driver is assigned to one of six mutually exclusive experience-related groupings in creating a profile that is based, at least in part, on driver experience. As another example, the parameter regarding vehicle age is assigned to one of six mutually exclusive vehicle age-related groupings in creating a profile that is based, at least in part, on vehicle age. The mutually exclusive groupings may be qualitative or quantitative in differentiation. For example, cornering may be assigned to mutually exclusive groupings comprising "light lateral acceleration"; "moderate lateral acceleration"; and "high lateral acceleration," with thresholds being preset in programming without user input that determine quantitatively the differences in light, moderate, and high lateral acceleration.

FIG. 7 is an illustration showing an exemplary graphical user interface 112 of a program by which a speed policy is created in accordance with one or more aspects and features of the invention. By defining a speed policy, a user is able to specify in the policy top speeds of the vehicle for a plurality of speed limit zones. A user further may specify in the speed policy an overspeed by which a vehicle is allowed to travel over the specified top speeds of the vehicle in speed limit zones. The overspeed may be specified by a speed or by a percentage, and a user further may specify in the speed policy a maximum duration of time during which the vehicle may travel over the specified top speeds in accordance with the overspeed. A user also may specify in the speed policy a maximum speed of the vehicle that is absolute and irrespective of any particular speed limit zone. If only an overspeed is specified, then the overspeed preferably would be applied to the speed limit in each respective speed limit zone as opposed to the user-specified top speed in each speed limit zone.

Figure 9:
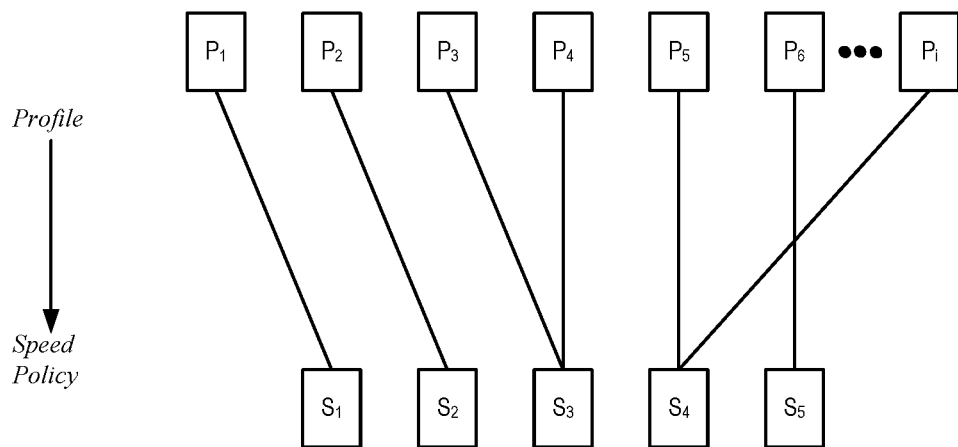
FIG. 9 is an illustration showing associations that have been created between a profiles and a plurality of speed policies in accordance with one or more aspects and features of the invention.

FIG. 8 is an illustration showing an exemplary graphical user interface 114 of a program by which a selected profile is associated with a selected speed policy in accordance with one or more aspects and features of the invention. A user makes an association by selecting a profile from the drop-down control and selecting the speed policy to be associated therewith from the drop-down control. Multiple policies may be associated with the same speed profile, which is illustrated in FIG. 9. Specifically, FIG. 9 illustrates associations that have been created between a plurality of profiles $P_1$, $P_2$, $P_3$, $P_4$, $P_5$, $P_6$ . . . $P_i$ and a plurality of speed policies $SP_1$, $SP_2$, $SP_3$, $SP_4$, $SP_5$ in accordance with one or more aspects and features of the invention.

A program preferable matches parameters of a given driving instance to identify an applicable profile and, based on the identified profile, a speed policy is identified through the association previously made. The identified speed profile then is implemented in an intelligent speed adaptation (ISA) system in limiting speeds of a vehicle in accordance with such implemented policy. Preferably, a predetermined profile is identified for a given driving instance by selecting the profile for which the highest number of identified parameters of the driving instance are members of the specified groupings of the profile. A tie-braking procedure also may be used if more than one profile is identified. Such tie-breaking procedure may comprise simply taking the speed policy with the most limiting speeds. Alternatively, the tie-breaking procedure may comprise identifying a composite predetermined speed policy by taking the lowest speed specified by the speed policies with respect to each speed limit zone and with respect to the maximum speed and the overspeed.

By using profiles associated with speed policies, a greater degree of granular control in limiting speeds of a vehicle based on specific parameters of a given driving instance is achieved, which greater degree of granular control is believed to be an improvement over the prior art.

Figure 10:
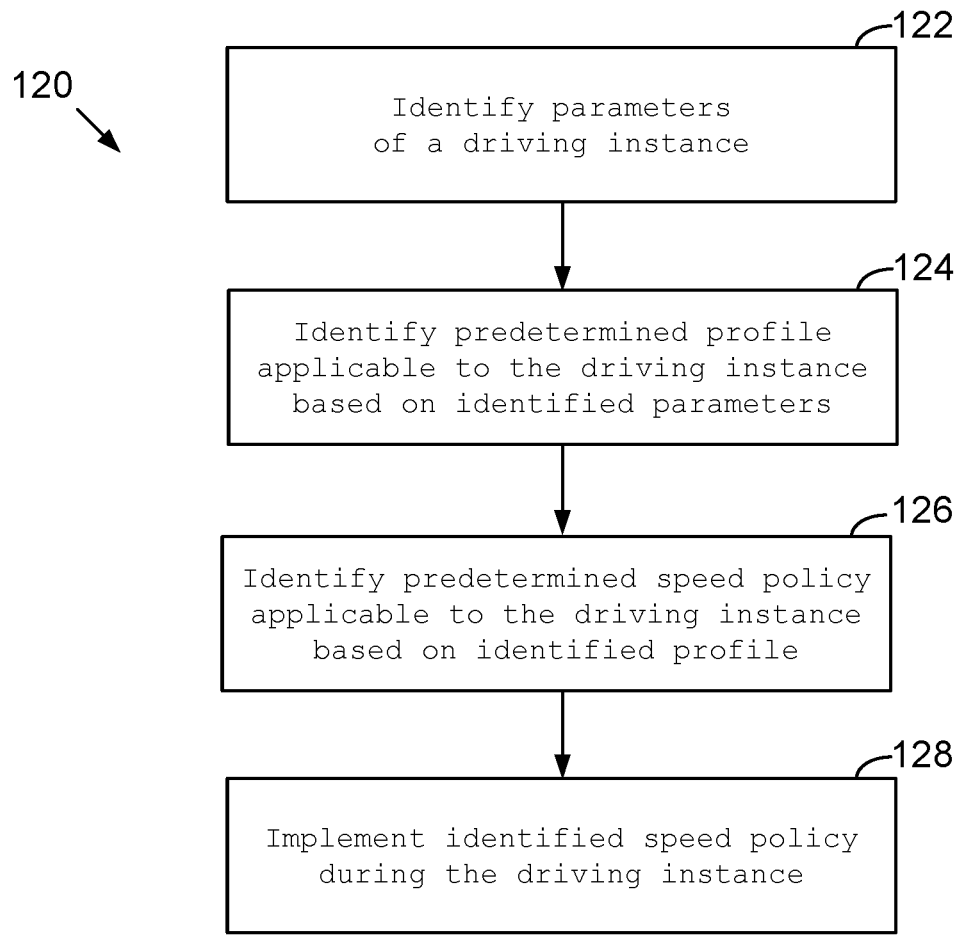
FIG. 10 is an illustration of a method in accordance with one or more aspects and features of the invention.

FIG. 10 is an illustration of a method 120 in accordance with one or more aspects and features of the invention. The method comprises the step 122 of identifying parameters of a given driving instance; the step 124 of identifying a predetermined profile that is applicable to the driving instance based on the identified parameters; the step 126 of identifying a predetermined speed policy that is applicable to the driving instance based on the identified profile; and the step 128 of implementing the identified speed policy during the driving instance. The speed profile preferably is implemented at the vehicle using an ISA system of the vehicle. These steps 122, 124, 126, 128 also may be repeated during the driving instance, whereby different predetermined speed polices are implemented during the driving instance.

Preferably, step 122 of identifying parameters of a given driving instance is performed at the vehicle using one or more sensors. The parameters may be circumstance parameters, vehicle parameters, behavior parameters, driver parameters (such as hours of service), and combinations of those parameters.

The method further may comprise, as a preliminary step to step 124, communicating to the vehicle predetermined profiles, determining one or more profiles at the vehicle itself, or both; and the method further may comprise, as a preliminary step to step 126, communicating to the vehicle predetermined speed policies, determining one or more speed policies at the vehicle itself, or both. Thus, for example, the ISA system may create one or more speed policies or one or more profiles at the vehicle itself. Additionally, predetermined profiles or predetermined speed policies—or both predetermined profiles and predetermined speed policies—may be predetermined and programmed within machine-readable medium of the vehicle before a driving instance. Such machine-readable medium may comprise computer memory at the vehicle that is accessible by the ISA system of the vehicle.

Figure 11:
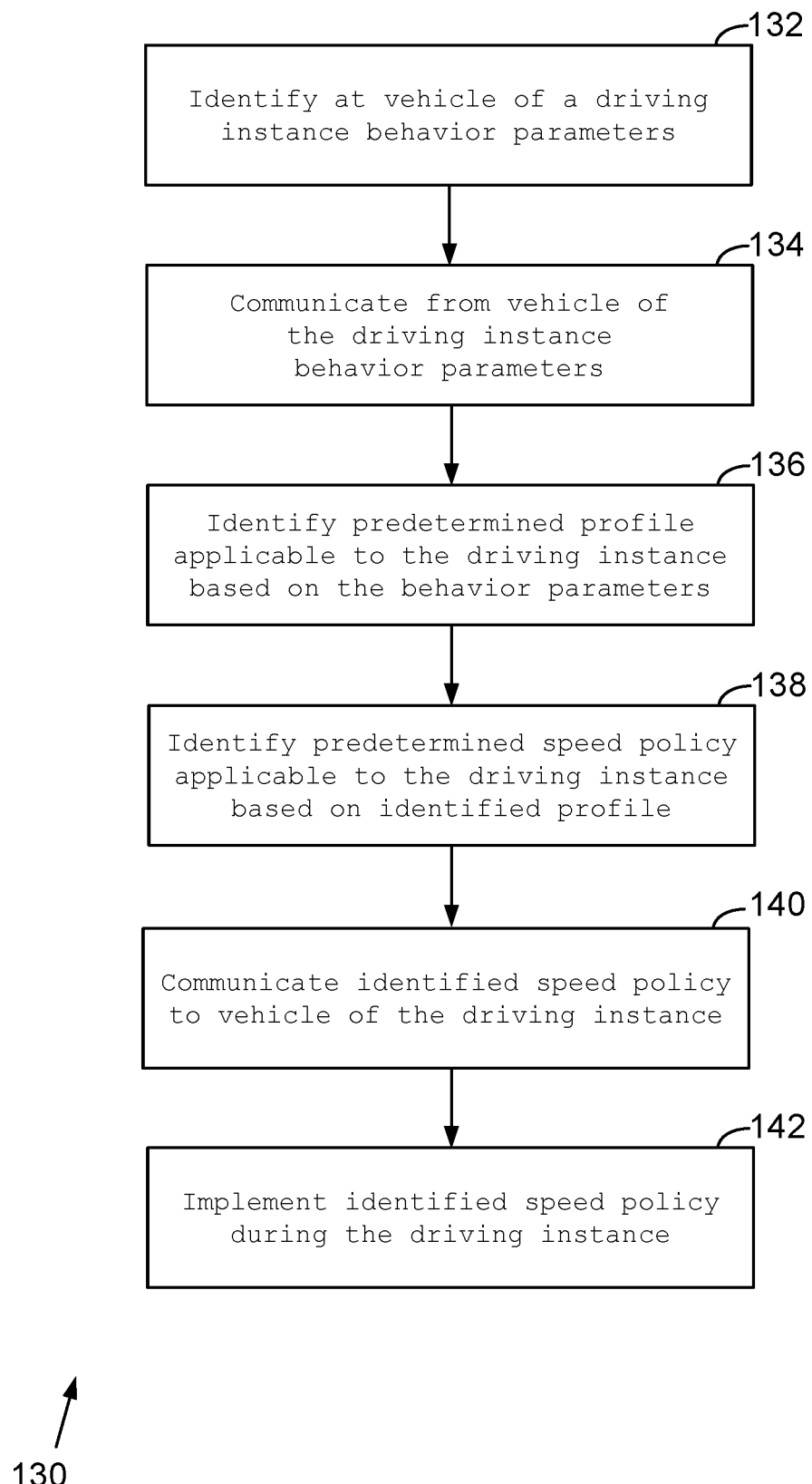
FIG. 11 is an illustration of a method in accordance with one or more aspects and features of the invention.

FIG. 11 is an illustration of a method 130 in accordance with one or more aspects and features of the invention. The method comprises the step 132 of identifying at a vehicle of a driving instance behavior parameters; the step 134 of communicating from the vehicle of the driving instance the identified behavior parameters; the step 136 of identifying a predetermined profile that is applicable to the driving instance based on the behavior parameters; the step 138 of identifying a predetermined speed policy that is applicable to the driving instance based on the identified profile; the step 140 of communicating the identified speed policy to the vehicle of the driving instance; and the step 142 of implementing the identified speed policy during the driving instance. Communications from and to the vehicle preferably are accomplished wirelessly using cellular data technology. Furthermore, the speed profile preferably is implemented at the vehicle using an ISA system of the vehicle.

It will be appreciated that in some implementations of method 130 the identification of the applicable profile and resulting speed policy may be independent of the particular driver who drives the vehicle during the driving instance, and may be independent of the particular vehicle that is driven during the driving instance.

Figure 12:
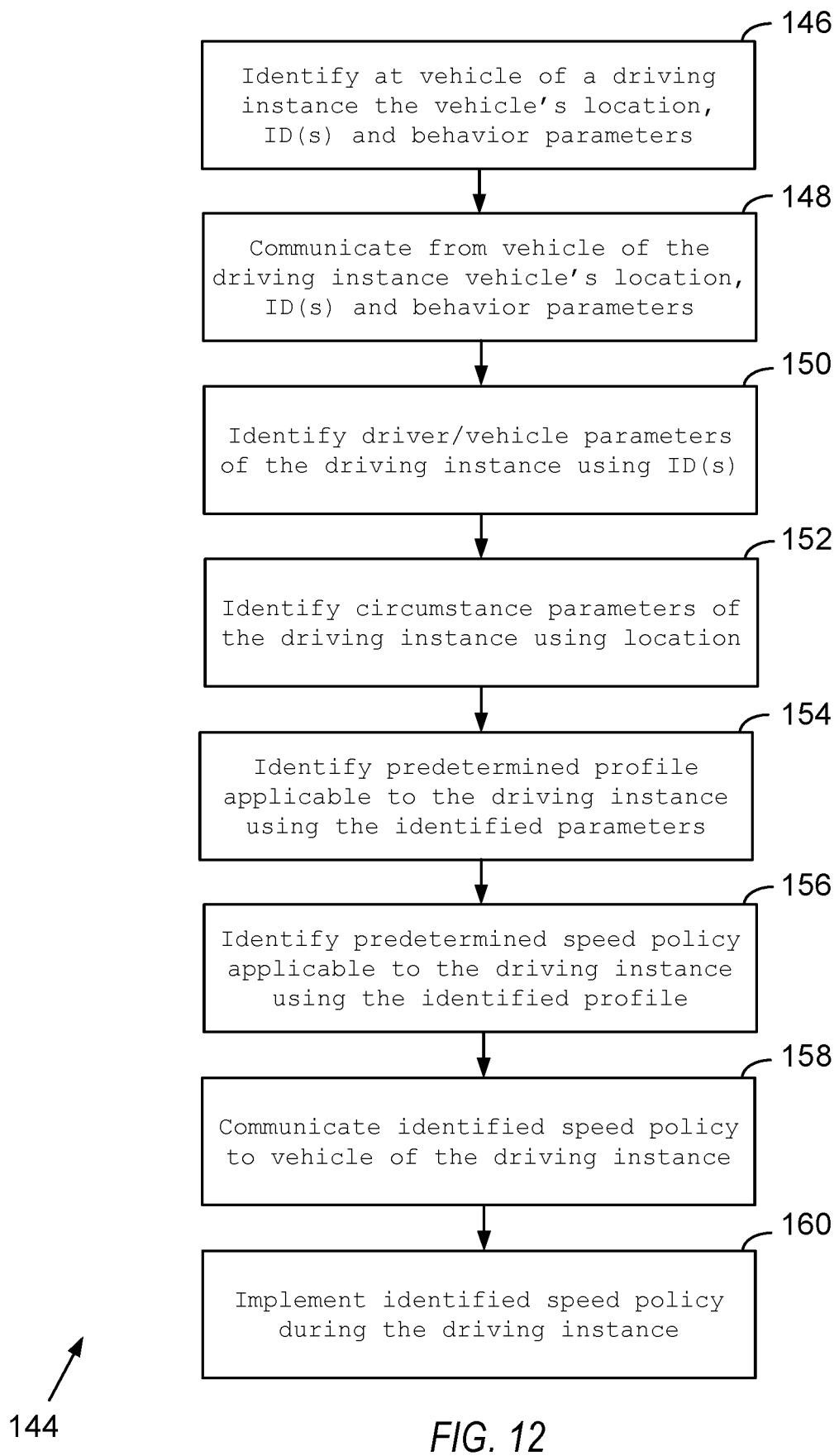
FIG. 12 is an illustration of another method in accordance with one or more aspects and features of the invention.

FIG. 12 is an illustration of another method 144 in accordance with one or more aspects and features of the invention. The method comprises the step 146 of identifying at a vehicle of a driving instance the vehicle's location, an identification of the vehicle and/or an identification of the driver, and behavior parameters of the driving instance; the step 148 of communicating from the vehicle of the driving instance the identified location, identification(s), and behavior parameters; the step 150 of identifying driver parameters and/or vehicle parameters using the identification(s); the step 152 of identifying circumstance parameters of the driving instance using the vehicle's location; the step 154 of identifying a predetermined profile that is applicable to the driving instance based on the identified parameters; the step 156 of identifying a predetermined speed policy that is applicable to the driving instance based on the identified profile; the step 158 of communicating the identified speed policy to the vehicle of the driving instance; and the step 160 of implementing the identified speed policy during the driving instance. Communications from and to the vehicle preferably are accomplished wirelessly using cellular data technology. Furthermore, the speed profile preferably is implemented at the vehicle using an ISA system of the vehicle. A communication including an exemplary speed policy for implementation by an ISA system is seen at 208 in FIG. 19.

In method 140 the identification of the applicable profile and resulting speed policy may be dependent on certain driver parameters and may be dependent on certain vehicle parameters. Consequently, an identification of the driver and/or an identification of the vehicle will be necessary and preferably is communicated from the vehicle in step 148.

An identification of the driver may be obtained from in-cab driver direct interaction. This can be accomplished, for example, through use by the drive of a keypad, touchscreen, electronic smart card reader, or biometric input that authenticates the driver and that provides an identification of the driver for use in accordance with the invention. An identification of a driver may comprise a unique driver username which is communicated from the vehicle. An exemplary format for such communication is illustrated at 202 in FIG. 16. Alternatively, if the vehicle includes an electronic logging device (ELD), an identification of the driver may be obtained from the ELD.

An identification of the vehicle preferably comprises the VIN of the vehicle since every vehicle is presumed to have a unique VIN number. An exemplary communication using a VIN for obtaining vehicle parameters from an organization is illustrated at 212 in FIG. 21. Furthermore, if a vehicle is uniquely associated with a driver at an organization, then the VIN may serve as a driver identification by which driver parameters can be obtained from an organization. An exemplary communication identifying a driver as a "trainee"—an experience related driver parameter—is seen at 212 in FIG. 20. It is noted that while the driver parameter indicates that the driver is a trainee, there is no information that specifically identifies the identify of a particular driver; a profile is identified and an associated speed policy is identified preferably without reliance on the identify of a particular driver as opposed to, for example, a classification or grouping of drivers.

Figure 13:
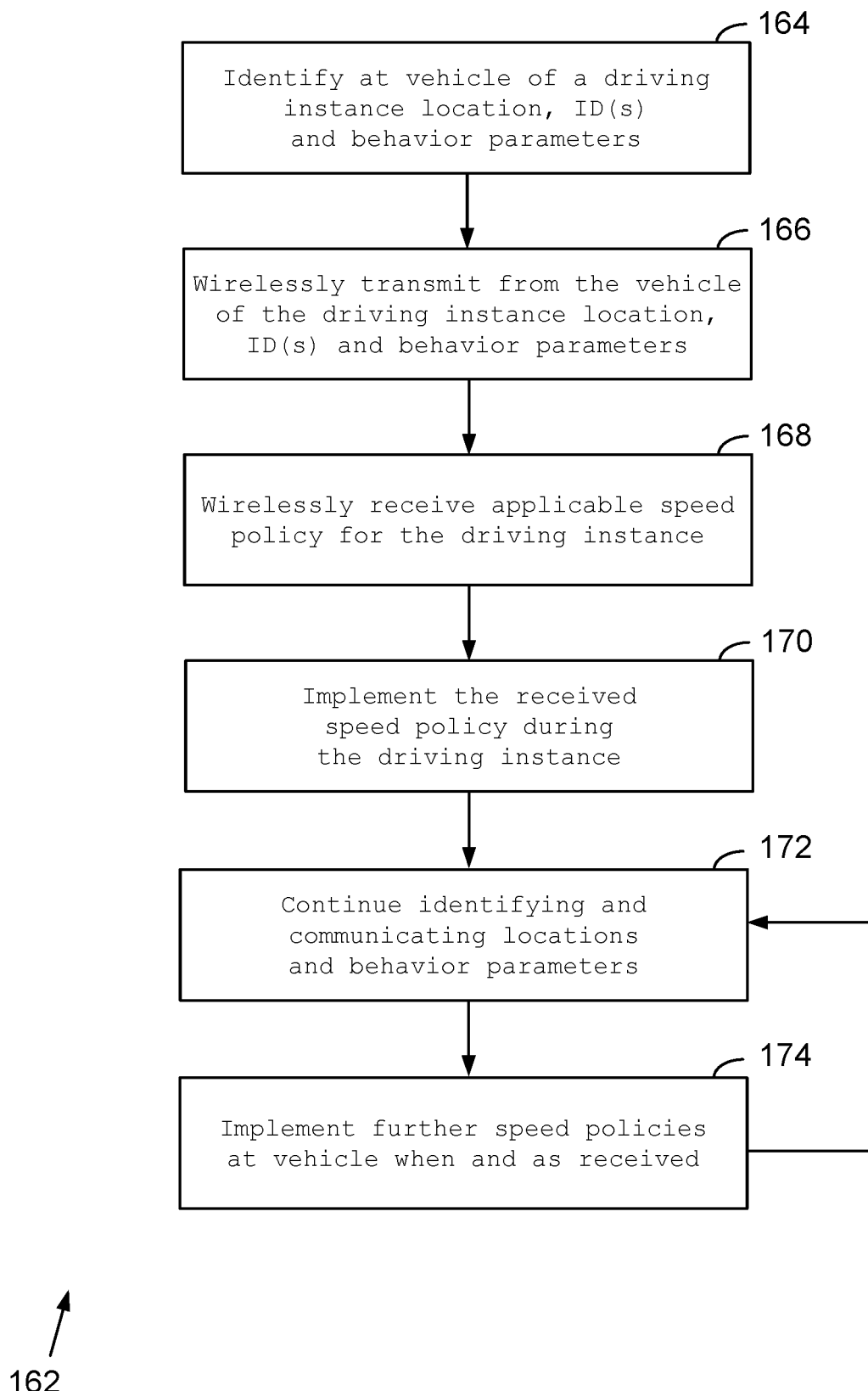
FIG. 13 is an illustration of another method in accordance with one or more aspects and features of the invention.

FIG. 13 is an illustration of another method 162 in accordance with one or more aspects and features of the invention. The method 162 is performed at a vehicle of a driving instance and comprises the step 164 of identifying the vehicle's location, an identification of the vehicle and/or an identification of the driver, and behavior parameters of the driving instance; the step 166 of wirelessly transmitting from the vehicle the identified location, identification(s), and behavior parameters; the step 168 of wirelessly receiving a speed policy that is applicable to the driving instance; the step 170 of implementing the received speed policy during the driving instance.

Figures 15, 16, 17, 18:
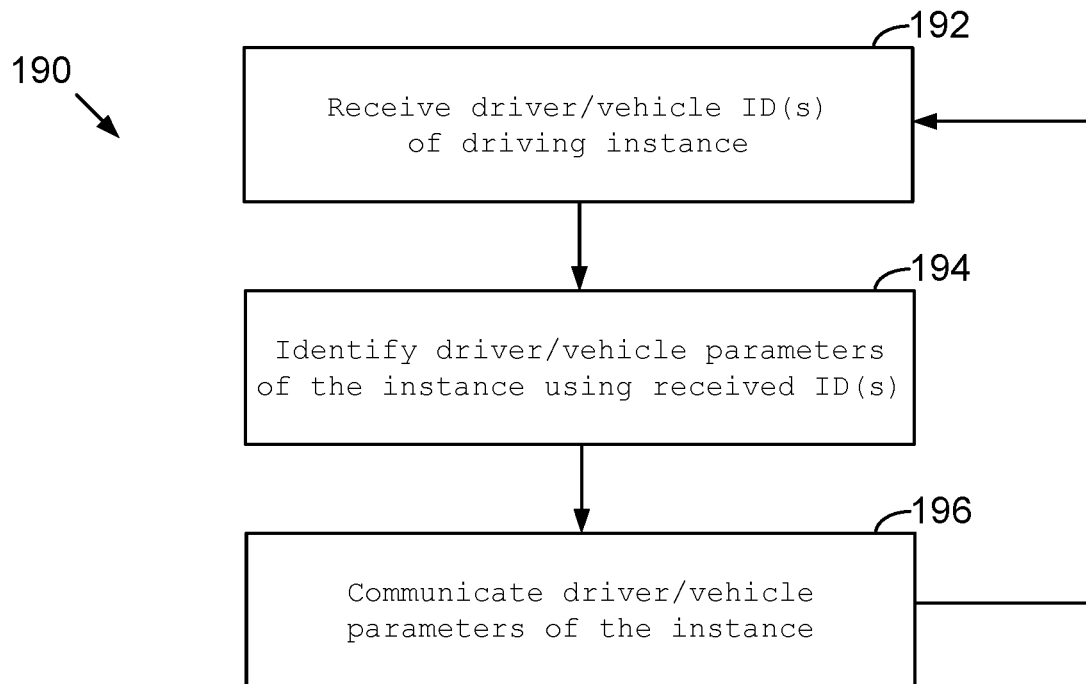
FIG. 15 is an illustration of another method in accordance with one or more aspects and features of the invention.
FIG. 16 is an illustration of a format for a message for communicating a driver username in accordance with one or more aspects and features of the invention.
FIG. 17 is an illustration of an exemplary message for communicating information regarding an engine startup signaling the beginning of a driving instance in accordance with one or more aspects and features of the invention.
FIG. 18 is an illustration of an exemplary message for reporting a behavior parameter in accordance with one or more aspects and features of the invention.

The method 162 optionally further includes the step 172 of continuing to identify and communicate locations and behavior parameters of the driving instance, and the step 174 of implementing further speed policies at the vehicle when and as further speed policies are received. This repetition of the steps preferably occurs at fixed time intervals during the driving instance. For example, an exemplary communication that may be sent includes an average following distance as a behavior parameter; FIG. 18 includes an exemplary message at 206 of such communication, in which an average following distance of 35 feet is indicated in a 25 mph speed zone for the fixed time interval being reported.

Wireless communications from and to the vehicle preferably are accomplished using cellular data technology. Furthermore, each speed profile preferably is implemented at the vehicle using an ISA system of the vehicle.

Figure 14:
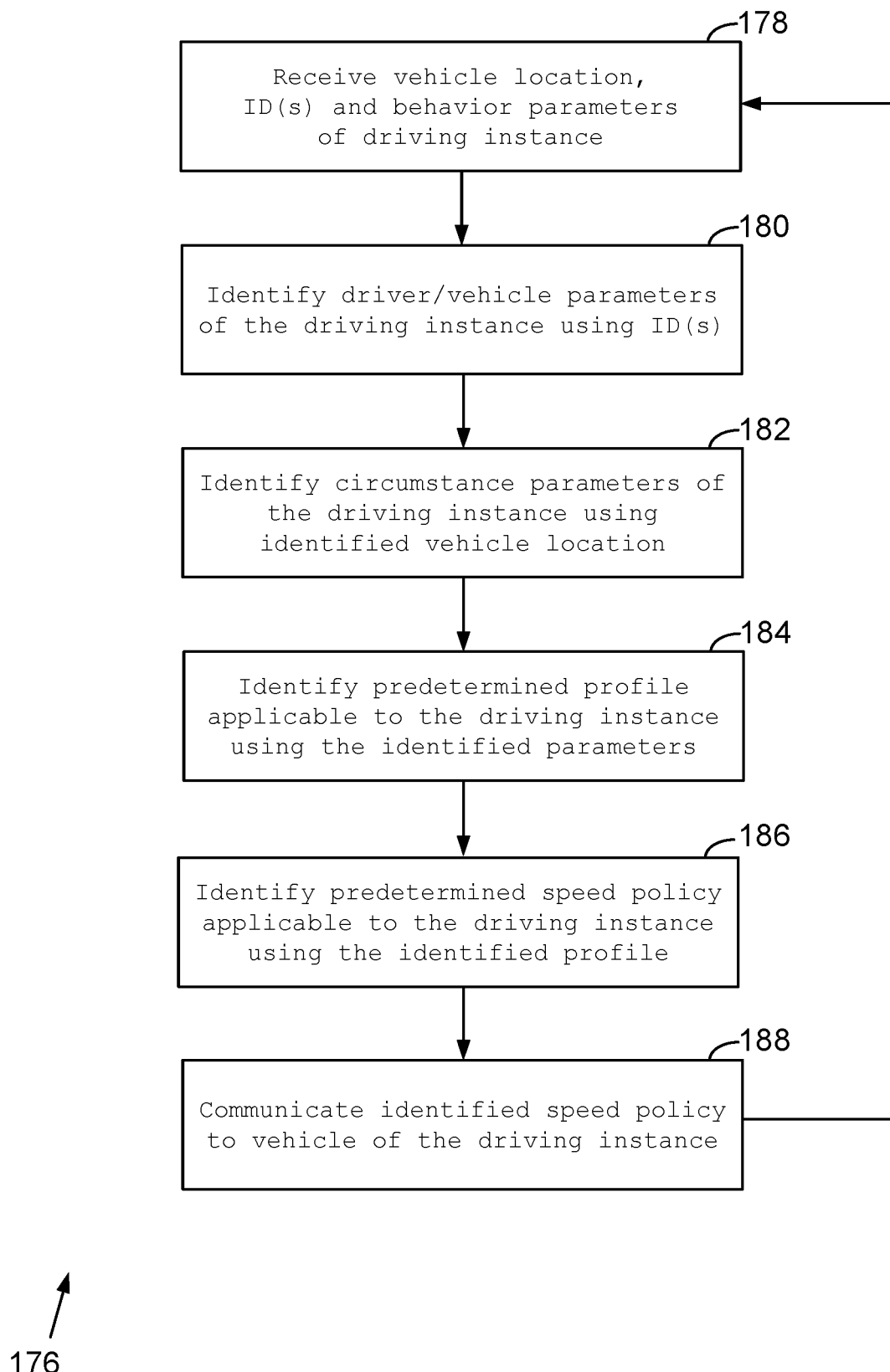
FIG. 14 is an illustration of another method in accordance with one or more aspects and features of the invention.

FIG. 14 is an illustration of another method 176 in accordance with one or more aspects and features of the invention. The method 176 is performed remote from the vehicle of the driving instance and, preferably, by an online computer system that comprises one or more computer networked servers that may be part of one or more cloud resources configured to perform the method 176. The method 176 comprises the step 178 of receiving the vehicle's location, an identification of the vehicle and/or an identification of the driver, and behavior parameters of the driving instance; the step 180 of identifying driver parameters and/or vehicle parameters using the identification(s); the step 182 of identifying circumstance parameters of the driving instance based on the vehicle's location; the step 184 of identifying a predetermined profile that is applicable to the driving instance based on the identified parameters; the step 186 of identifying a predetermined speed policy that is applicable to the driving instance based on the identified profile; and the step 188 of communicating the identified speed policy to the vehicle of the driving instance. Communications of step 186 as well as communications that may be involved in the receiving step 178 preferably comprise, at least in part, secure communications over the Internet.

FIG. 15 is an illustration of another method 190 in accordance with one or more aspects and features of the invention. The method 190 is performed remote from the vehicle of the driving instance and, preferably, by an online computer system that comprises one or more computer networked servers that may be part of one or more cloud resources configured to perform the method 190. The method 190 comprises the step 192 of receiving an identification of the vehicle and/or an identification of the driver of a driving instance of a vehicle; the step 194 of identifying driver parameters and/or vehicle parameters using the received identification(s); and the step 196 of communicating the identified parameters of the driving instance (preferably to the sender of the identification(s) in step 192). Communications of step 196 as well as communications that may be involved in the receiving step 192 preferably comprise, at least in part, secure communications over the Internet.

FIG. 22 is an illustration of an exemplary implementation of a preferred system 300 in accordance with one or more aspects and features of the invention. The system comprises a vehicle such as a tractor trailer 302 that includes one or more communication devices enabling wireless communications between tractor trailer 302 while mobile and networked computer system 304 over the Internet, which is represented by cloud 308. Preferably the networked computer system 304 includes a web portal for access by users (e.g., fleet operators) in order to create profiles, create speed policies, and/or create associations between the profiles and policies.

The system 300 preferably utilizes methods described above and disclosed in the drawings. As such, the communications shown in FIG. 22 preferably include, for example: (1) communication 332 from the truck to networked computer system 304 which communications include a current location of the tractor trailer 302, an identification of the tractor trailer 302, an identification of the driver of the tractor trailer 302, and behavior parameters of the driving instance of the tractor trailer 302; (2) communication 334 from networked computer system 304 to networked computer system 306 which communications include the identification of the tractor trailer 302 and the identification of the driver of the tractor trailer 304; (3) communication 336 from networked computer system 306 to networked computer system 304 which communications include vehicle parameters identified using the identification of the tractor trailer 302 and driver parameters identified using the identification of the driver of the tractor trailer 302; and (4) communication 338 from the networked computer system 304 to the tractor trailer 302 which communication 338 includes an identified speed policy for implementation at the tractor trailer 302 during the driving instance.

The first networked computer system 304 preferably is provided by a third-party as a service offering to an organization that employs the driver of the tractor trailer 302, which organization also preferably is responsible for maintaining the tractor trailer 302. The second networked computer system 306 preferably is operated and maintained by the organization, which could be expected to have the information and data regarding vehicle parameters and driver parameters. Under this model, the organization accesses the networked computer system 304 and creates the profile and policies to be used for its tractor trailers in the system 300.

Figure 23:
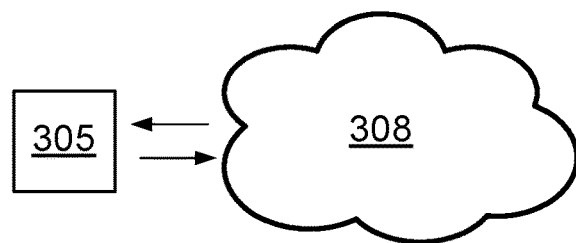
FIG. 23 is an illustration of an exemplary implementation of a system in accordance with one or more aspects and features of the invention.

FIG. 23 is an illustration of an exemplary alternative implementation of the system 300 in accordance with one or more aspects and features of the invention. In the system of FIG. 23, the two networked computer systems 304, 306 have been consolidated into a single networked computer system 305 which the organization itself operates and maintains.

Figure 24:
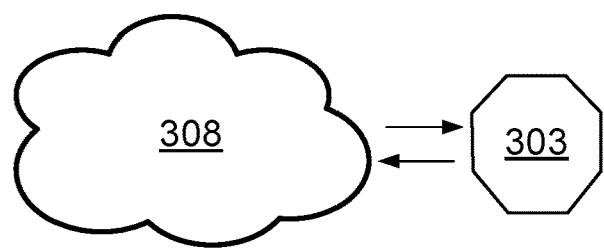
FIG. 24 is an illustration of an exemplary implementation of a system in accordance with one or more aspects and features of the invention.

FIG. 24 is an illustration of another exemplary alternative implementation of the system 300 in accordance with one or more aspects and features of the invention. In the system of FIG. 24, the two networked computer systems 304, 306 have been consolidated, this time into a single networked computer system 303 which the third-party service provider operates and maintains for the organization. In this model, the third-party service provider acquires and maintains the information and data regarding vehicle parameters and driver parameters used in methods of the invention.

Figure 25:
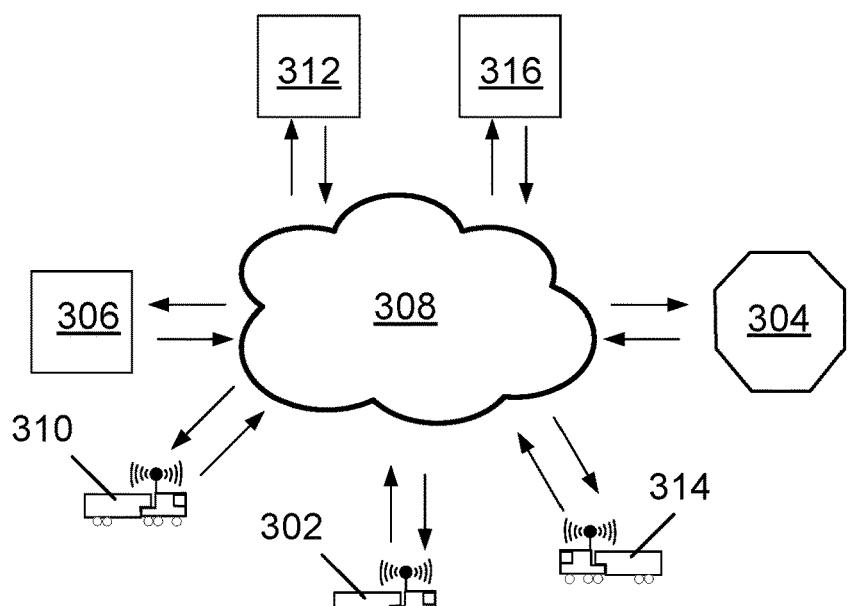
FIG. 25 is an illustration of an exemplary implementation of a system in accordance with one or more aspects and features of the invention.

FIG. 25 is an illustration of yet another exemplary alternative implementation of the system 300 in accordance with one or more aspects and features of the invention. In the system of FIG. 25, additionally organizations respectively maintain additional networked computer systems 312, 316 and respectively have their own tractor trailers 310, 314. In this model, the third-party service provider provides the service offering to each of the additional organizations that it provides to the first organization. In this model, each organization creates its own profiles and speed policies. Additionally, the third-party service provider preferably has standard profiles and speed policies that it has created for convenience and use by the organizations.

In one or more alternatives to one or more of the foregoing implementations, an identification of the driver is communicated to a telematics service provider or to an original equipment manufacturer (OEM) which maintains driver parameters, rather than to the organization that employs the driver.

One or more advantages are seen from implementation of methods and systems in accordance with one or more aspects and features of the invention. The following scenarios illustrate a few such advantages.

Protecting Against Inexperienced Drivers

When providing a fleet vehicle to an inexperienced driver, an organization is able to provide a more restrictive speed policy than to experienced drivers. It is believed that this will enable the organization to better protect its vehicles.

Protecting Drivers on Probation

One the big challenges of the trucking industry is that of driver shortage. If a driver has too many speeding tickets, the driver is prone to being fired and getting hired by another organization often presents challenges. By applying more restrictive speed policies for such "at risk" drivers, an organization can both increase driver retention and increase the available pool of drivers from which to hire.

Incentivizing Good Driving with More Permissive Speed Policies

It is believed that drivers can be incentivized by being allowed to go faster on highways (but always within allowed speed limits) in order to compensate for more restrictive speeds on secondary roads. Such incentives could be provided to drivers with good safety records, while those drivers with less than good safety records would have a more restrictive speed policy on both highways and secondary roads.

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention.

Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. An automated method of controlling a speed of a vehicle having an intelligent speed adaptation system, comprising the steps of:
 (a) identifying an identification of the vehicle;
 (b) identifying an identification of the driver;
 (c) identifying, at the vehicle using one or more sensors during a driving instance of the vehicle, a location of the vehicle;
 (d) identifying, at the vehicle using one or more sensors during a driving instance of the vehicle, behavior parameters of the driving instance;
 (e) wirelessly transmitting, from the vehicle during the driving instance, the identification of the vehicle, the identification of the driver, the location of the vehicle, and the behavior parameters of the driving instance;

(f) wirelessly receiving, at the vehicle of the driving instance, a speed policy that is applicable to the driving instance of the vehicle based on the communicated identification of the vehicle, the communicated identification of the driver, the transmitted location of the vehicle, and the transmitted behavior parameters; and (g) implementing, during the driving instance using the intelligent speed adaptation system, the applicable speed policy that was received by the vehicle.

2. An automated method of providing a speed policy for controlling a speed of a vehicle having an intelligent speed adaptation system during a driving instance of the vehicle, comprising the steps of:

(a) receiving a location of the vehicle, an identification of the driver, an identification of the vehicle, and behavior parameters of the driving instance of the vehicle that are identified at and communicated from the vehicle;

(b) identifying circumstance parameters based on the received location of the vehicle;

(c) identifying driver parameters based on the identification of the driver;

(d) identifying vehicle parameters based on the identification of the vehicle;

(e) identifying a predetermined profile that is applicable to the driving instance of the vehicle based on the circumstance parameters, the identified driver parameters, the identified vehicle parameters, and the communicated behavior parameters;

(f) identifying a predetermined speed policy that is applicable to the driving instance based on the identified profile; and (g) communicating, to the vehicle, the identified speed policy applicable to the driving instance for implementation using the intelligent speed adaptation system.

3. The method of claim 2, wherein identifying driver parameters based on the identification of the driver comprises communicating the identification of the driver and receiving back the driver parameters for the driver.

4. The method of claim 3, wherein the communicating of the identification of the driver comprises communicating the identification of the driver to an organization that employs the driver.

5. The method of claim 2, wherein identifying vehicle parameters based on the identification of the vehicle comprises communicating the identification of the vehicle and receiving back the vehicle parameters for the vehicle.

6. The method of claim 5, wherein communicating the identification of the vehicle comprises communicating the identification of the vehicle to an organization that maintains the vehicle.

7. The method of claim 2, further comprising continuing to receive locations of the vehicle and behavior parameters of the driving instance, identifying predetermined profiles and corresponding speed policies based thereon, and communicating those identified speed policies to the vehicle.

8. The method of claim 2, wherein behavior parameters for a vehicle during the driving instance comprise at least one of speed of the vehicle, acceleration of the vehicle, hard braking of the vehicle, following distance of the vehicle, swerving, and cornering of the vehicle.

9. The method of claim 2, wherein vehicle parameters for the driving instance comprise at least one of age of the vehicle, mileage of the vehicle, engine maintenance information of the vehicle, brake maintenance information of the vehicle, and tire maintenance information of the vehicle.

10. The method of claim 2, wherein circumstance parameters for the driving instance comprise at least one of time of day of the driving instance, road information associated with the driving instance, inclement weather associated with the driving instance, and traffic congestion associated with the driving instance.

11. The method of claim 2, wherein driver parameters for the driving instance comprise at least one of age of the driver, experience of the driver, number of citations accumulated by the driver, and rate of citations accumulated by the driver over predetermined periods of time.

12. The method of claim 2, wherein a predetermined speed policy specifies top speeds of the vehicle for a plurality of speed limit zones.

13. The method of claim 12, wherein the predetermined speed policy further specifies an overspeed by which a vehicle is allowed to travel over the specified top speeds of the vehicle in speed limit zones.

14. The method of claim 13, wherein the speed policy further specifies a maximum duration of time during which the vehicle may travel over the specified top speeds.

15. The method of claim 2, wherein a predetermined speed policy specifies a maximum speed of the vehicle.

16. A system in which a speed policy is used for controlling a speed of a vehicle having an intelligent speed adaptation system during a driving instance of the vehicle, comprising:

(a) a vehicle comprising sensors configured to measure behavior parameters during an instance of driving the vehicle and wirelessly communicate from the vehicle the behavior parameters, a location of the vehicle, an identification of the vehicle, and an identification of the driver; and (b) a networked computer system (i) configured to receive the behavior parameters, the location of the vehicle, and the identification of the driver, (ii) configured to identify circumstance parameters based on the vehicle location, (iii) configured to identify vehicle parameters based on the vehicle identification, (iv) configured to identify driver parameters based on the driver identification, (v) configured to identify a predetermined profile that is applicable to the driving instance based on the received behavior parameters, the identified circumstance parameters, the identified vehicle parameters, and the identified driver parameters, (vi) configured to identify a predetermined speed policy that is applicable to the driving instance based on the identified profile, and (vii) configured to communicate, to the vehicle, the identified speed policy applicable to the driving instance;

(c) wherein the vehicle further comprises a speed control system configured to receive and implement the communicated speed policy applicable to the driving instance, whereby the speed of the vehicle is limited.

17. The system of claim 16, further comprising another networked computer system configured to receive, from the first mentioned networked computer system, the vehicle identification, access vehicle parameters associated with the vehicle identification, and communicate in response the accessed vehicle parameters to the first mentioned networked computer system.

18. The system of claim 17, wherein the second networked computer system is operated by the organization that maintains the vehicle, and wherein the first mentioned networked computer system is operated by a third-party service provider which provides the first mentioned networked computer system to the organization as a commercial offering.

19. The system of claim 16, further comprising a second networked computer system configured to receive, from the first mentioned networked computer system, the driver identification, access driver parameters associated with the driver identification, and communicate in response the accessed driver parameters to the first mentioned networked computer system.

20. The system of claim 19, wherein the second networked computer system is operated by the organization that employees the driver, and wherein the first mentioned networked computer system is operated by a third-party service provider which provides the first mentioned networked computer system to the organization as a commercial offering.

* * * * *